United States Patent
Lin et al.

(10) Patent No.: US 9,331,732 B2
(45) Date of Patent: May 3, 2016

(54) PROTECTIVE STRUCTURE AND ELECTRONIC DEVICE HAVING THE SAME AND METHOD FOR MANUFACTURING THE SAME

(71) Applicant: WISTRON CORP., New Taipei (TW)

(72) Inventors: Chi-Ping Lin, New Taipei (TW);
Chih-Feng Yeh, New Taipei (TW)

(73) Assignee: Wistron Corp., New Taipei (TW)

( * ) Notice: Subject to any disclaimer, the term of this patent is extended or adjusted under 35 U.S.C. 154(b) by 223 days.

(21) Appl. No.: 14/020,619

(22) Filed: Sep. 6, 2013

(65) Prior Publication Data

US 2014/0135081 A1    May 15, 2014

(30) Foreign Application Priority Data

Nov. 15, 2012 (TW) .............................. 101142562 A (51) Int. Cl.
*H04B 1/3888* (2015.01)

(52) U.S. Cl.
CPC ......... *H04B 1/3888* (2013.01); *Y10T 29/49826* (2015.01)

(58) Field of Classification Search
None
See application file for complete search history.

(56) References Cited

U.S. PATENT DOCUMENTS 5,045,208 A * 9/1991 Sanford et al. ................ 210/656
5,958,571 A * 9/1999 Omura ........................ 428/316.6
2005/0030707 A1 * 2/2005 Richardson et al. .......... 361/681
2006/0142405 A1   6/2006 Kijima
2006/0169608 A1 * 8/2006 Carnevali ..................... 206/320

FOREIGN PATENT DOCUMENTS

| CN | 1800255 A | 7/2006 |
|---|---|---|
| JP | 58-22129 A | 2/1983 |
| JP | 10-92205 A | 4/1998 |
| TW | 503089 | 9/2002 |
| TW | M269550 | 7/2005 |
| TW | M400235 U1 | 3/2011 |

OTHER PUBLICATIONS

Taiwan Patent Office, Office Action, Patent Application Serial No. 101142562, May 20, 2015, Taiwan.
China Patent Office, Office Action, Patent Application Serial No. 201210552427.3, Dec. 30, 2015, China.

* cited by examiner

*Primary Examiner* — Daniel Lai (57) ABSTRACT

A protective structure and an electronic device using the same are disclosed. The electronic device includes a first housing member, a second housing member, a blocking unit, and an operating module. The second housing member faces the first housing member, wherein a slit is located at the periphery of an enclosure disposed between the first and second housing members. The blocking unit, having a shape compatible with the shape of the slit, is disposed therein and includes a sealing member and a first foamable material. The sealing member is compressed by the first and second housing members, and the first foamable material is formed in the slit along an extending direction of the sealing member.

10 Claims, 6 Drawing Sheets

PROTECTIVE STRUCTURE AND ELECTRONIC DEVICE HAVING THE SAME AND METHOD FOR MANUFACTURING THE SAME

CROSS REFERENCE TO RELATED APPLICATIONS

This Application claims priority of Taiwan Patent Application No. 101142562, filed on Nov. 15, 2012, the entirety of which is incorporated by reference herein.

BACKGROUND OF THE INVENTION

1. Field of the Invention

The present invention relates to a protective structure and electronic device using the same and the manufacturing method thereof, and in particular to a protective structure with a foamable material to improve seal performance and electronic device using the same and the manufacturing method thereof.

2. Description of the Related Art

Electronic devices deployed in harsh conditions should meet some requirements, such as offering protection against water immersion and being compatible in low-temperature environments, etc. For a non-waterproofing interphone or an interphone that provides a poor air-tight seal, for example, damage can be caused by being dropped into water. Alternatively, if the interphone is used in a low-temperature environment, such as in an ice warehouse, the low temperature may also damage the functioning interphone.

While most manufacturers try to solve the aforementioned problems by positioning a sealing ring between the housing shells of the electronic device, the resultant waterproofing and airtightness are not stable and may be affected by the cross-sectional shape and the compression ratio of the sealing ring. Additionally, water may penetrate into the electronic device through a slit formed between the sealing ring and the housing shells, which causes a decrease in the reliability of the components of the electronic device.

Therefore, there is a great need for a protective structure to provide protection for components disposed an electronic device. For example, as mobile-communication technology is rapidly developing, a protective structure may be desired for a portable electronic device such as a cell phone, to provide waterproof, dustproof, and airtight functionality.

BRIEF SUMMARY OF THE INVENTION

To address the drawbacks of the abovementioned conventional electronic devices, the present disclosure provides a protective structure which is used for watertight, airtight, and dustproof purposes.

In one embodiment, the protective structure includes: a first housing member, a second housing member, and a blocking unit. The second housing member faces the first housing member, wherein a slit is located at the periphery of a enclosure disposed between the first and second housing members. The blocking unit, having a shape compatible with the shape of the slit, is disposed therein and includes a sealing member and a first foamable material. The sealing member is compressed by the first and second housing members, and the first foamable material is formed in the slit along an extending direction of the sealing member.

In the other embodiment, an electronic device using the above protective structure includes an operating module disposed in the protective structure.

Additionally, a method for manufacturing the protective structure is also disclosed, which includes: providing the first housing member; disposing the sealing member on the first housing member; providing the first foamable material corresponding to the sealing member and implementing a primary foaming process to the first foamable material; providing the second housing member; connecting the first and the second housing members and compressing the sealing member and the first foamable material by the first and second housing members; and implementing a secondary foaming process to the first foamable material which has been implemented in the primary foaming process.

BRIEF DESCRIPTION OF THE DRAWINGS

The present invention is more fully understood by reading the subsequent detailed description and examples with references made to the accompanying drawings, wherein.

DETAILED DESCRIPTION OF THE INVENTION

Several exemplary embodiments of the application are described with reference to FIGS. 1 through 6. It is to be understood that the following disclosure provides various different embodiments as examples for implementing different features of the application. This description is made for the purpose of illustrating the general principles of the invention and should not be taken in a limiting sense.

Figure 1:
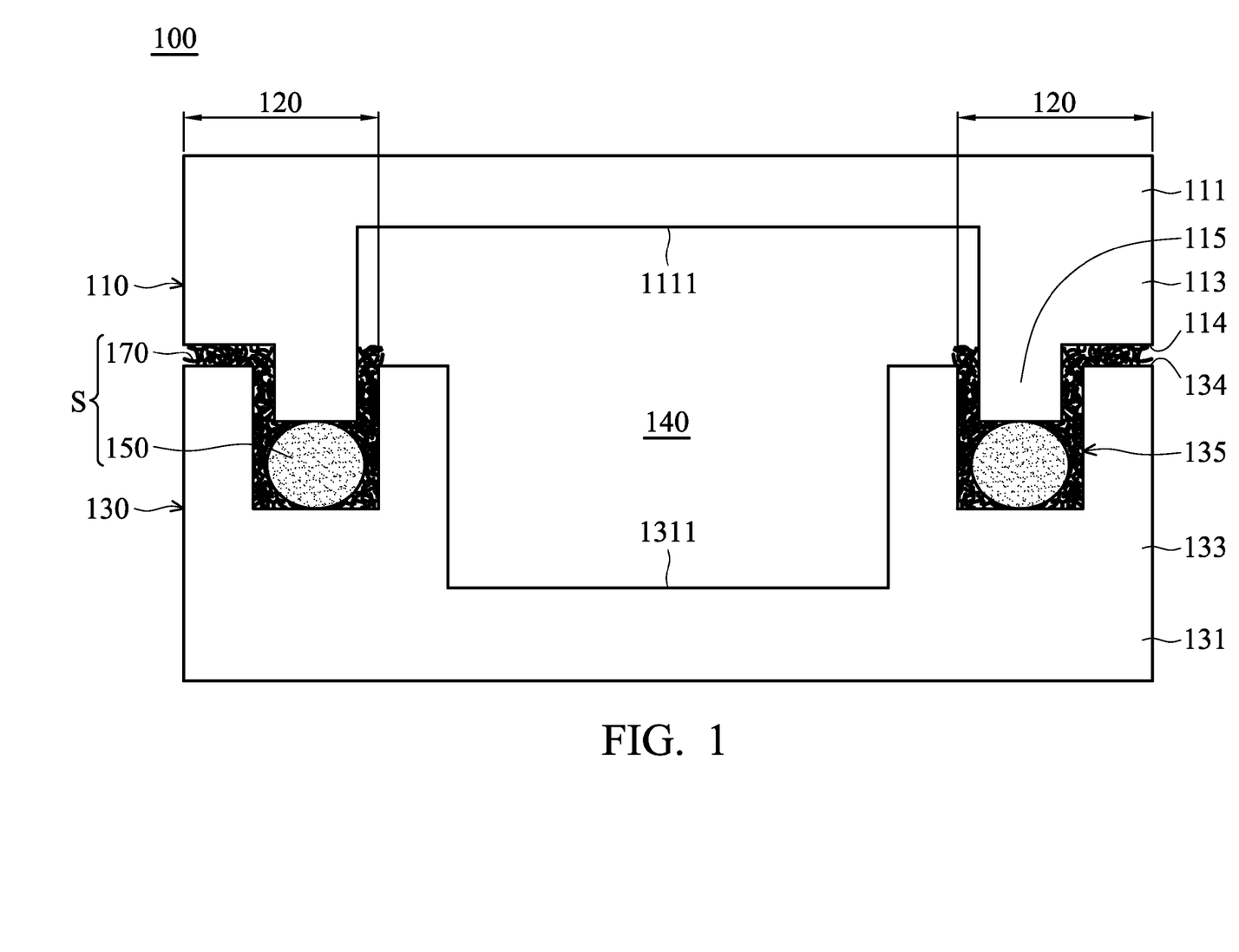
FIG. 1 shows a cross-sectional view of a protective structure of an embodiment of the present disclosure.

Referring to FIG. 1, a protective structure 100 of an embodiment of the invention includes a first housing member 110, a second housing member 130 and a blocking unit S. The first housing member 110 and second housing member 130 collectively define an enclosure 140 in the protective structure 100. The first housing member 110 includes an upper lid 111 and a first side wall 113. The first side wall 113 is formed as a single piece with the upper lid 111, wherein the first side wall 113 protrudes from the inner surface 1111 (one surface of the first housing member 111 which faces the enclosure 140 of the protective structure) of the upper lid 111 and terminates with a first engaging portion 115.

The second housing member 130 faces the first housing member 110 and includes a lower lid 131 and a second side wall 133. The second side wall 133 is formed as a single piece with the lower lid 131, wherein the second side wall 133 protrudes from the inner surface 1311 (one surface of the lower lid 131 which faces the enclosure 140 of the protective structure) of the lower lid 131 and terminates with a second engaging portion 135 which faces the first engaging portion 115. In this embodiment, the first engaging portion 115 includes an embossed flange, and the second engaging portion 135 includes a recess, but it should not be limited thereto.

The first engaging portion 115 and the second engaging portion 135 may be any suitable configuration which is compatible with the dimensions and functions of each other. For the purpose of illustration, in the following description, the embossed flange 115 refers to the first engaging portion, and the recess 135 refers to the second engaging portion.

The first housing member 110 is assembled with the second housing member 130 through the connection of the embossed flange 115 of the first side wall 113 and the recess 135 of the second side wall 133, wherein a slit 120, disposed at a periphery of the enclosure 140, is formed between the end surface 114 of the first side wall 113 and the end surface 134 of the second side wall 133. In order to adequately certify the enclosure 140 in the protective structure 100 to meet the requirements of having waterproof, dustproof, and airtight properties, the blocking unit S, having a shape compatible with the shape of the slit 120, is therefore disposed in the slit 120.

Specifically, the blocking unit S includes a sealing member 150 and a first foamable material 170. The sealing member 150 is disposed in the recess 135 and compressed by the first and second housing members 110, 130. In the embodiment, the sealing member 150 is an O-ring. While the sealing member 150 has a circular cross-section shape, the invention is not limited thereto. The sealing member 150 may have any cross-section shape such as trapezoid.

The first foamable material 170 includes flexible and pliable close-cell type ethylene vinyl acetate copolymer (EVA) and is formed in the slit 120 along an extending direction of the sealing member 150. It is noted that because the first foamable material 170 is implementing a secondary foaming process within the slit 120, the slits formed between the sealing member 150 and the first and second side walls 113, 133 can be reliably sealed. Therefore, the waterproof, dustproof, and airtight properties of the enclosure 140 are further improved.

Specifically, while the enclosure 140 is surrounded by the sealing member 150 which is compressed by the first and second side walls 113, 133, the sealing member 150 cannot still avoid a slit from being formed between the first and the second side walls 113, 133. To address this problem, the first foamable material 170 is filled in between the sealing member 150 and the first and second side walls 113, 133 so that the slit therebetween can be completely or substantially completely sealed. In some embodiments, the first foamable material 170, surrounding the enclosure 140 has a substantial annular structure. In other embodiments, the first foamable material 170 completely covers the outer side of the sealing member 150. In yet other embodiments, the first foamable material is filled in a region including a side of the sealing member 150 which is close to and/or away from the enclosure 140.

Figure 2:
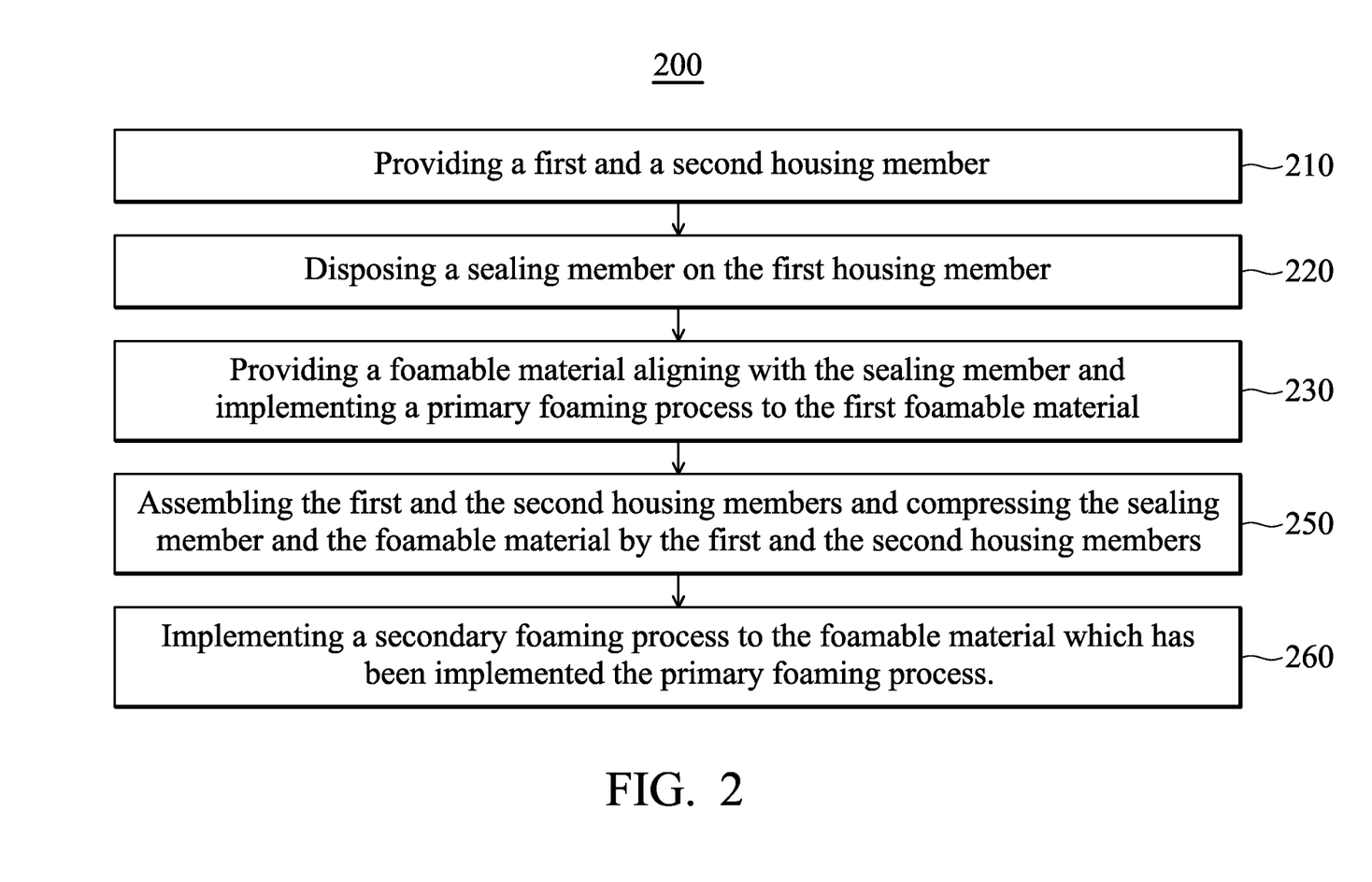
FIG. 2 shows flow chart of a manufacturing process of the protective structure of an embodiment of the present disclosure.

Referring to FIGS. 1 and 2, in which FIG. 2 illustrates a flow chart showing a method 200 for manufacturing the protective structure 100. In step 210, the first and second housing members 110, 130 are provided. In some embodiments, the first and second housing members 110, 130 are made in a projection-molding apparatus (not shown in the figures). In step 220, the sealing member 150 is disposed on the second housing member 130, wherein the sealing member 150 is mounted in the recess 135. In step 230, the first foamable material 170 is applied aligning with the sealing member 150 and is implemented a primary foaming process in the recess 135. In some embodiments, both the steps of disposing the sealing member 150 and of applying the first foamable material 170 are complemented in the projection-molding apparatus.

In step 240, the first and second housing members 110, 130 are assembled, wherein the sealing member 150 and the first foamable material 170 are compressed by the first and second housing members 110, 130. In some embodiments, the sealing member 150 is compressed by the surface of the embossed flange 115 and the surface of the recess 135. On the other hand, the first foamable material 170 is compressed not only by the surface of the embossed flange 115 and the surface of the recess 135 but the surfaces 114, 134 of the first and the second housing members 110, 130. In step 250, the first foamable material 170 which has been implemented in the primary foaming process is implemented in a secondary foaming process. In some embodiments, prior to the step of implementing a secondary foaming process to the first foamable material 170 which has been implemented in the primary foaming process, the method 200 further includes providing a heating oven (not shown in the figures) and moving all of the first and the second housing members, the sealing member and the first foamable material into the heating oven.

Figure 3:
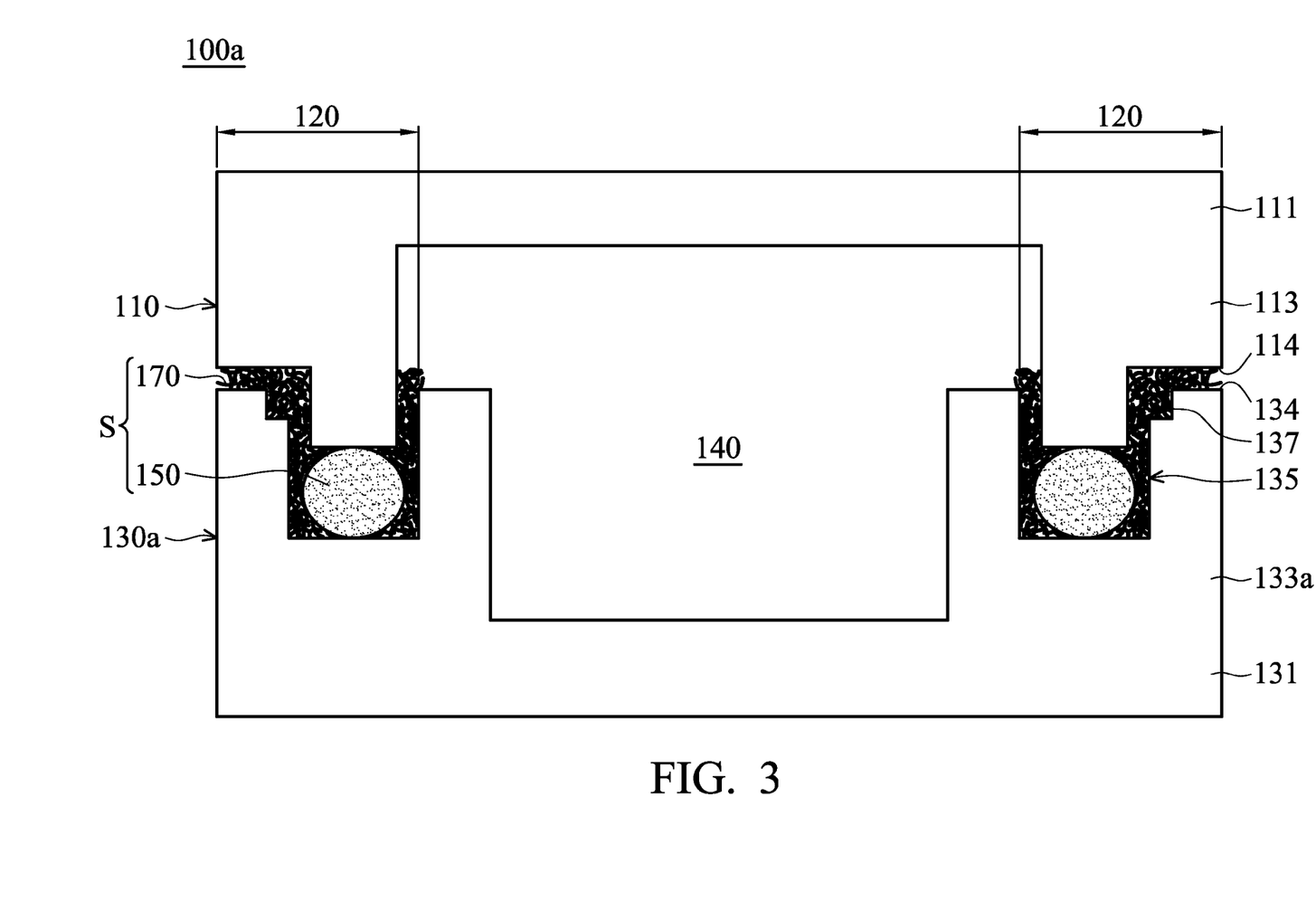
FIG. 3 shows a cross-sectional view of a protective structure of the other embodiment of the present disclosure.

Referring to FIG. 3, a protective structure 100a in accordance with the other embodiment of the present invention is shown. In FIG. 3, components identical to those in FIG. 1 will be represented by similar reference numbers, and the features thereof will not be further described in the interest of brevity. The protective structure 100a includes a first housing member 110, a second housing member 130a and a blocking unit S. The protective structure 100a characterized by the feature that the second side wall 133a further includes an accommodation groove 137 in the vicinity of the recess 135, wherein the accommodation groove 137 faces the slit 120. With the accommodation groove 137, which provides an excessive space to accommodate the first foamable material 170 after its expansion due to being treated in the secondary foaming process, the production efficiency of the protective structure 100a may be improved.

Figure 4:
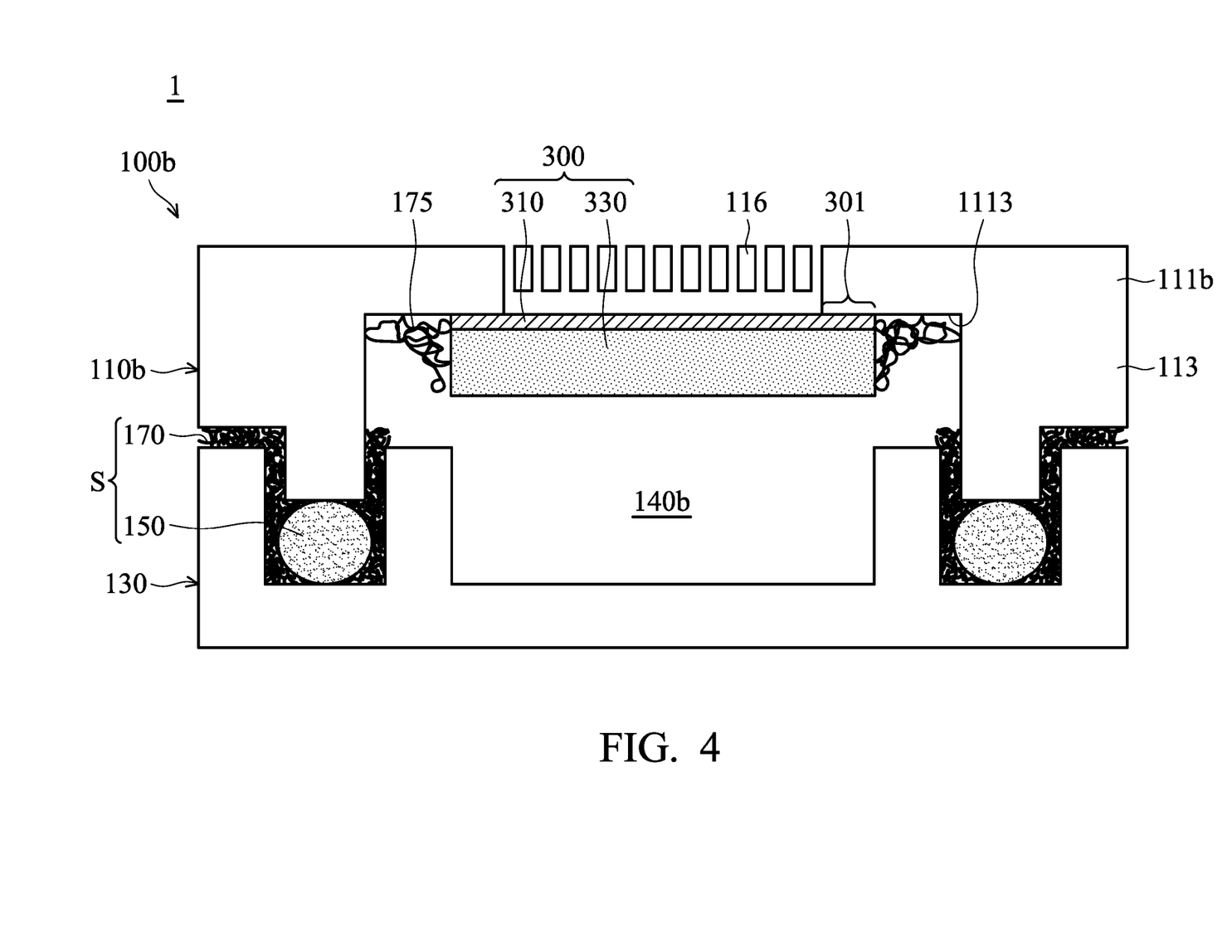
FIG. 4 shows a cross-sectional view of an electronic device of an embodiment of the present disclosure including the protective structure.

Referring to FIG. 4, an electronic device 1 in accordance with one of the embodiments of the present invention is shown. In FIG. 4, components of the protective structure 100b which are identical to those of protective structure 100 in FIG. 1 will be represented by similar reference numbers, and the features thereof will not be further described in the interest of brevity. The electronic device 1 in accordance includes a protective structure 100b and an operating module 300. The protective structure 100b includes a first housing member 110b, a second housing member 130, a blocking unit S and a second foamable material 175. An opening 116 is formed on the upper lid 111b of the first housing member 110b to communicate the enclosure 140b and the outside atmosphere.

The operating module 300 is a speaking module which includes a membrane 310 and a speaker 330, wherein the membrane 310 (such as Gore-membrane) is formed on the speaker 330. The operating module 300 aligning with the opening 116 is connected to the inner surface 1113 of the upper lid 111b through a connecting surface 301 of the operating module 300. The second foamable material 175 is provided at a vicinity of the connecting surface 301 that is at a corner where the operating module 300 and the inner surface 1113 meet so as to block the moisture, air or dust from entering the enclosure 140b. The second foamable material 175 may be the same as or different from the first foamable material 170. In one embodiment, the second foamable material 175 includes ethylene vinyl acetate copolymer (EVA) and is implemented in the secondary foaming process.

Figure 5:
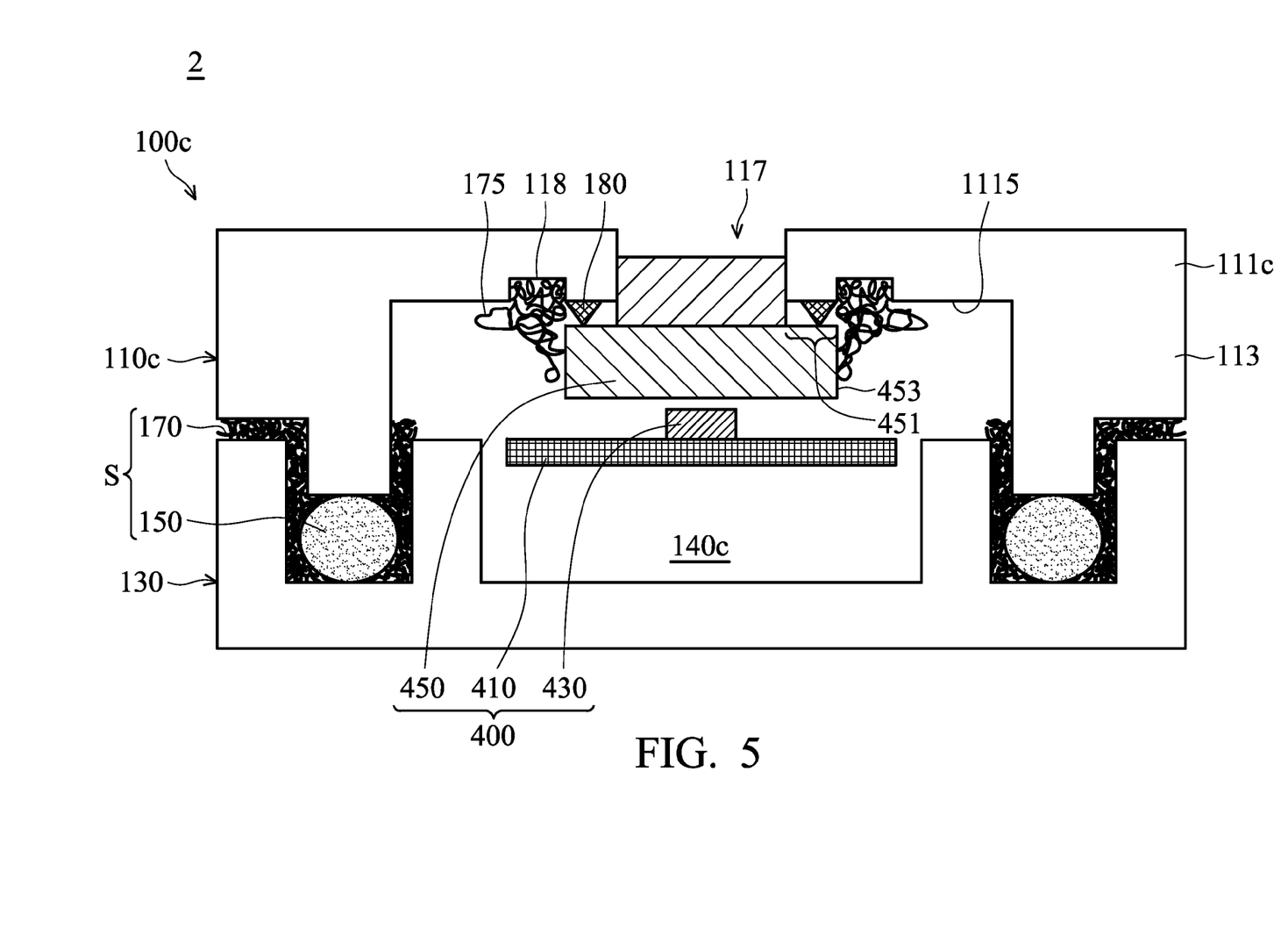
FIG. 5 shows a cross-sectional view of an electronic device of the other embodiment of the present disclosure including the protective structure.

Referring to FIG. 5, an electronic device 2 in accordance with one of the embodiments of the present invention is shown. In FIG. 5, components of the protective structure 100c which are identical to those of protective structure 100 in FIG.

1 will be represented by similar reference numbers, and the features thereof will not be further described in the interest of brevity. The protective structure 100c includes a first housing member 110c, a second housing member 130, a blocking unit S and a second foamable material 175. An opening 117 is formed on the upper lid 111c of the first housing member 110b to communicate the enclosure 140b and the outside atmosphere.

The operating module 400 is a lighting module which includes a substrate 410, a light source 430 and a lens assembly 450. The light source 430 is disposed on the substrate 410 and configured to emit light toward the lens assembly 450. The lens assembly 450 aligning with the opening 117 is connected to the inner surface 1115 of the upper lid 111c through a connecting surface 451 thereof. In some embodiments, a hot melt adhesive 180 which undergoes exposition to ultraviolet radiation is used to adhere the inner surface 1115 and the connecting surface 451. An accommodation groove 118, having an inner edge connected to one of the side walls 453 of the lens assembly 450, is formed on the upper lid 111c adjacent to the connecting surface 451. It is noted that during the manufacturing, the second foamable material 175 which is implemented in a secondary foaming process in the accommodation groove 118 may expand to a position adjacent to the connecting surface 451 that is a corner where the side wall 453 of the operating module 400 and the inner surface 1115 meet. Therefore, the moisture, air and dust from the exterior is blocked from entering into the operating module 400 through the connecting surface 451.

Figure 6:
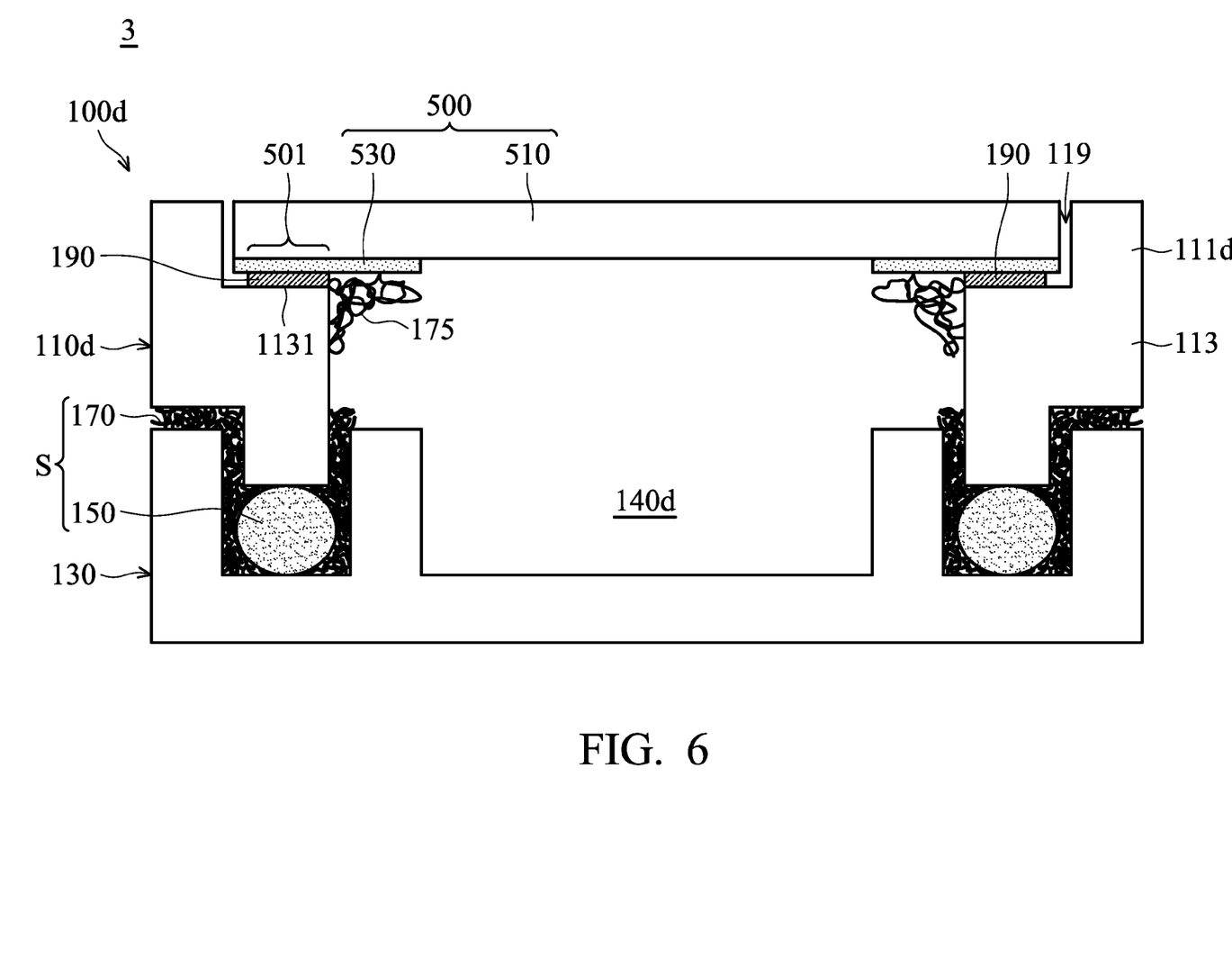
FIG. 6 shows a cross-sectional view of an electronic device of yet another embodiment of the present disclosure including the protective structure.

Referring to FIG. 6, an electronic device 3 in accordance with one of the embodiments of the present invention is shown. In FIG. 6, components of the protective structure 100d which are identical to those of protective structure 100 in FIG. 1 will be represented by similar reference numbers, and the features thereof will not be further described in the interest of brevity. The protective structure 100d includes a first housing member 110d, a second housing member 130, a blocking unit S, and a second foamable material 175. An upper lid 111d of the first housing member 110d has an opening 119, and a side wall 113 of the first housing member 110d has a bearing surface 1131 which is adjacent to the opening 119.

The operating module 500 is a display module which includes a display panel 510. The outer edge of the back side of the display panel 510 includes a connecting surface 501, through which the operating module 500 is connected to the bearing surface 1131 of the first housing member 110d, and wherein an adhesive 190 is disposed between the bearing surface 1131 and the connecting surface 501. The second foamable material 175 is applied at a vicinity of the connecting surface 501 that is a corner where the first side wall 113 and operating module 500 meet. Therefore, the moisture, air and dust from the exterior may be blocked from entering into the operating module 500 through the connecting surface 501. Additionally, oil 530 may be used to cover the second foamable material 175 and the adhesive 190 to prevent the second foamable material 175 and the adhesive 190 from being seen by the viewer. It is noted that through the arrangement of the second foamable material 175, the thickness of the adhesive 190 which was used to block external substances may be decreased. Thus, the object of making a thinner electronic device can be achieved.

Through the sealing member and the foamable material which has been implemented in a secondary foaming process to seal the slit formed between two housing members, the protective structure of the disclosure may be used for watertight, airtight, and dustproof purposes. On the other hand, the foamable material which has been implemented in a secondary foaming process may also be used to block the moisture, air, and dust from entering the electronic device thorough a slit formed between the operating module and the housing member.

While the invention has been described by way of example and in terms of preferred embodiment, it is to be understood that the invention is not limited thereto. On the contrary, it is intended to cover various modifications and similar arrangements (as would be apparent to those skilled in the art). In addition, the number of light sources is selected according to demand; for example, one or more than one LEDs facing the edge of the light guide plate may be used.

What is claimed is:

1. A protective structure, comprising:
    a first housing member;
    a second housing member, facing the first housing member, wherein a slit is located at a periphery of an enclosure disposed between the first and the second housing members; and
    a blocking unit, disposed in the slit, wherein the blocking unit has a shape compatible with the shape of the slit, and the blocking unit comprises:
        a sealing member, compressed by the first and the second housing members; and
        a first foamable material, formed in the slit along an extending direction of the sealing member;
    wherein the first housing member comprises a first side wall, and the second housing member comprises a second side wall, and wherein the first and the second housing members are connected together via the first and second side walls, and the slit is located between the first and second side walls;
    wherein at least one of the first side wall and the second side wall comprises an accommodation groove adjacent to the slit and configured to be used to receive the first foamable material.

2. The protective structure as claimed in claim 1, wherein the slit surrounds the periphery of the enclosure, and the sealing member comprises an O-ring.

3. The protective structure as claimed in claim 1, wherein the first foamable material is a secondary foaming material.

4. A method for manufacturing a protective structure according to claim 1, comprising:
    providing the first housing member;
    disposing the sealing member on the first housing member;
    providing the first foamable material corresponding to the sealing member and implementing a primary foaming process to the first foamable material;
    providing the second housing member;
    assembling the first and the second housing members and compressing the sealing member and the first foamable material by the first and the second housing members; and
    implementing a secondary foaming process to the first foamable material which has been implemented the primary foaming process.

5. The method as claimed in claim 4, wherein prior to the step of implementing a secondary foaming process to the first foamable material which has been implemented in the primary foaming process, the method further comprises providing a heating oven and moving all of the first and second housing members, the sealing member, and the first foamable material into the heating oven.

6. The method as claimed in claim 5, wherein after the step of implementing the secondary foaming process to the first foamable material which has been implemented in the primary foaming process, the method further comprises standing the protective structure for a predetermined time, so as to harden the first foamable material in between the first and second housing members.

7. The method as claimed in claim 4, wherein in the step of providing the first housing member, the first housing member is formed in an injection molding equipment, and the primary foaming process to the first foamable material is implemented in the injection molding equipment.

8. The protective structure as claimed in claim 1, wherein the slit comprises a first segment extending in a first direction and a second segment extending in a second direction perpendicular to the first direction, the sealing member is disposed in the first segment, and the first foamable material is formed in the first and the second segments.

9. An electronic device, comprising:
   a protective structure, comprising:
      a first housing member;
      a second housing member, facing the first housing member, wherein a slit is located at a periphery of an enclosure disposed between the first and the second housing members; and
      a blocking unit, disposed in the slit, wherein the blocking unit has a shape compatible with the shape of the slit, and the blocking unit comprises:
         a sealing member, compressed by the first and the second housing members; and
         a first foamable material, formed in the slit along an extending direction of the sealing member;
      an operating module, disposed in the protective structure; and
      a second foamable material which is a secondary foaming material, wherein the protective structure comprises an opening formed at the first housing member, and wherein the operating module is connected to the first housing member corresponding to the opening through a connecting surface thereof, and the second foamable material is provided at a position adjacent to the connecting surface.

10. The electronic device as claimed in claim 9, wherein the first housing member further comprises an accommodation groove adjacent to the connecting surface of the operating module and configured to be used to receive the second foamable material.

* * * * *